Patented Jan. 23, 1934

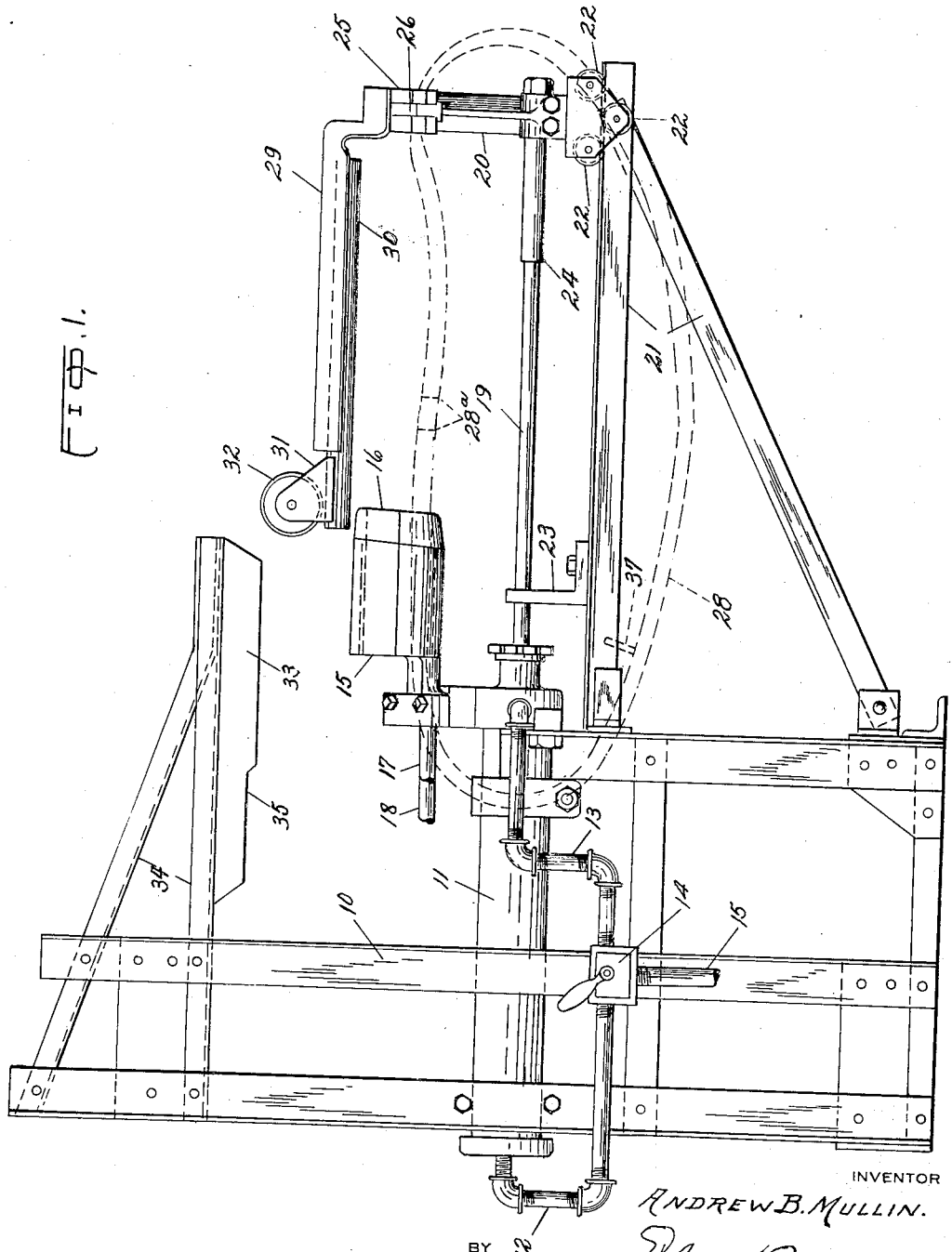

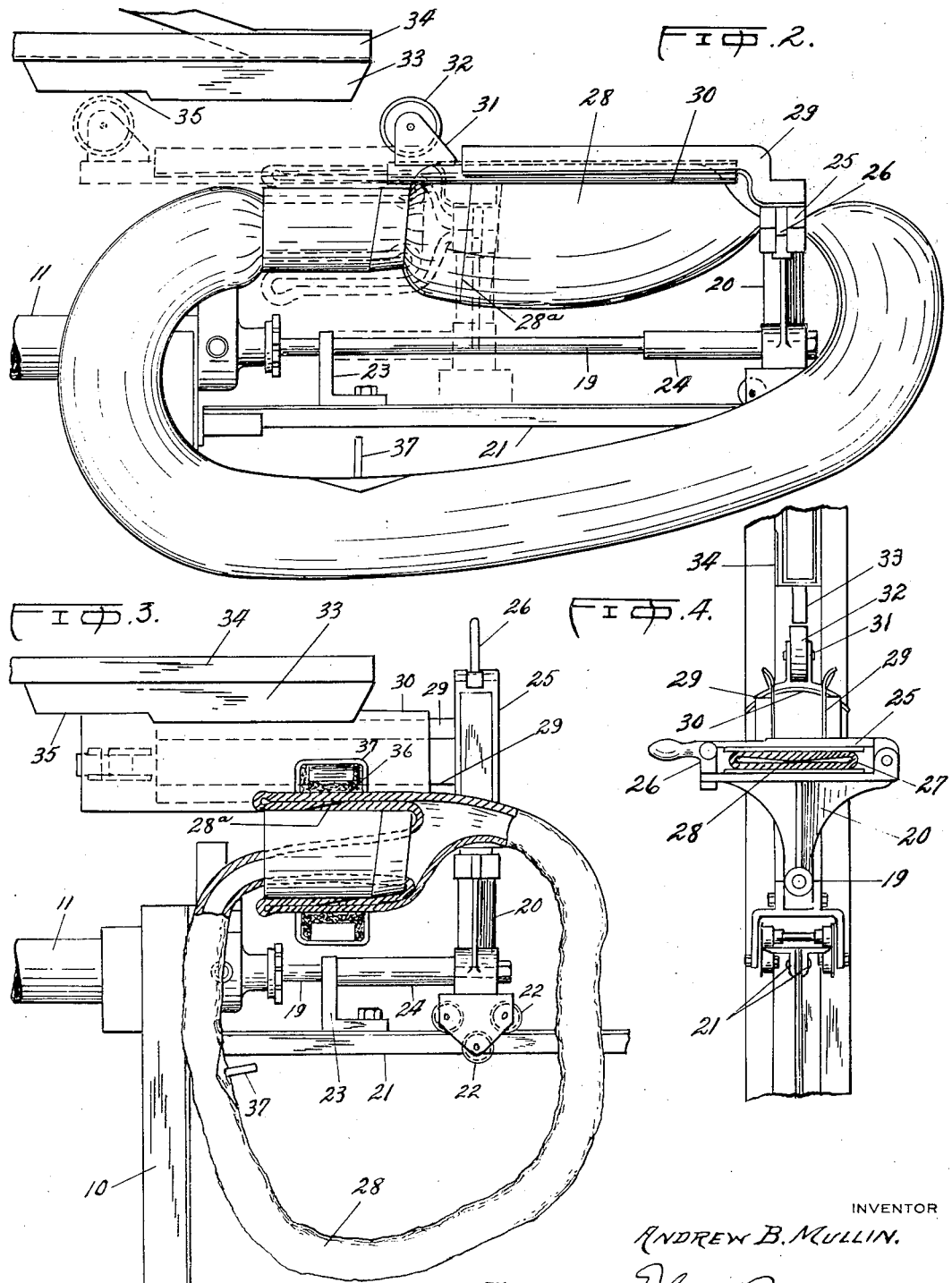

1,944,754

UNITED STATES PATENT OFFICE 1,944,754

SPLICE VULCANIZING APPARATUS

Andrew B. Mullin, Akron, Ohio, assignor to The Firestone Tire & Rubber Company, Akron, Ohio, a corporation of Ohio Application February 10, 1931. Serial No. 514,773

10 Claims. (Cl. 18—18)

This invention relates to splice vulcanizing apparatus, and more especially it relates to apparatus for vulcanizing transverse splices in endless rubber tubes, such as inner tubes for pneumatic tires.

The invention is designed for use with, and is appurtenant to splice vulcanizers of the type shown in the patent to Fetter No. 1,364,362, issued January 4, 1921. In vulcanizers of the type mentioned the tube is folded or cuffed back over a hollow heated mandrel so that the splice is positioned thereupon. This is a comparatively simple operation with small, thin-walled tubes, but with large, thick-walled tubes, especially puncture-resisting tubes of the compression type wherein the tubes have a thickened circumferential reinforcement, the cuffing operation is extremely arduous, frequently requiring the efforts of two or more operatives.

The chief objects of the invention are to provide power operated apparatus for cuffing a tube over a splice-vulcanizer; and to effect economy of time and labor in the vulcanizing of tube splices. Other objects will be manifest.

Of the accompanying drawings:

Figure 1 is a front elevation of apparatus embodying the invention in its preferred form, in work-receiving position;

Figure 2 is a fragmentary detail elevation of the operative elements of the apparatus, and the work therein, at the initial stage of operation;

Figure 3 is a view of the elements shown in Figure 2 during the vulcanizing operation, parts being in section; and Figure 4 is a fragmentary end elevation of the apparatus as viewed from the right of Figure 1, the work being shown in section therein.

Referring to Figure 1 of the drawings, 10 is an open framework and 11 is a double acting fluid-pressure-operated cylinder mounted thereupon in horizontal position, fluid being supplied to opposite ends of the cylinder by branch-pipes 12, 13 from a four-way valve 14, the latter being connected by a supply pipe 15 with a source of compressed fluid (not shown).

Mounted upon the front cylinder-head of the cylinder 11 is part of a vulcanizing apparatus comprising a tubular slotted mandrel 15, and a tapered leader or split sleeve 16 telescoped therewith. The mandrel 15 is hollow and the interior thereof is supplied with heated vulcanizing fluid through a pipe 17, a return pipe 18 being provided to effect circulation of the heated fluid in the mandrel. As is clearly shown in the drawings, the axis of the mandrel 15 and sleeve 16 is horizontal, and parallel to the axis of the cylinder 11.

The cylinder 11 is provided with a piston rod 19, the outer end of which is connected to a carriage 20 that rides upon a support-structure or trackway 21 extending laterally from the framework 10, the carriage being provided with flanged wheels 22, 22 which engage the top and bottom faces of laterally projecting flanges on the support-structure. The arrangement is such as to secure the carriage to the trackway and to prevent lateral deflection of the carriage.

The piston rod 19 extends through a stop-bracket 23 mounted upon the trackway 21 adjacent the front end of the cylinder 11, and a spacer sleeve or collar 24 is mounted upon the piston rod adjacent the carriage 20, the arrangement being such that movement of the carriage toward the cylinder is stopped when the sleeve 24 abuts the bracket 23. Spacer sleeves of different lengths may be used to vary the extent of the carriage's movement toward the cylinder 11.

As is shown in Figure 4, the top of the carriage 20 is relatively wide, and a cover plate or clamp 25 is hinged to one edge thereof, the other side of the clamp being provided with a latch 26 by which the clamp is locked in closed position upon the carriage. The upper face of the carriage and the lower face of the clamp define a work-receiving space 27 which is disposed substantially upon the extended axis of the mandrel 15, said space being adapted to receive the work which consists of an inner tube 28, and to flatten and constrict the same transversely in a local region thereof. The tube 28 is annular in form and has a transverse splice 28ª in its structure.

Mounted upon the upper side of the clamp 25 and extending therefrom toward the mandrel 15 are parallel brackets 29, 29 which support an elongated, transversely-arcuate guide or shield 30 which is substantially concentric with the axis of said mandrel and positioned somewhat above the latter, the guide being of sufficient length to overlie the forward end of the mandrel when the carriage 20 is in its outermost or inoperative position as shown in Figures 1 and 2. Mounted upon the upper side of the guide 30 at the end thereof remote from the carriage 20 is a bracket 31 in which is journaled a guide-roller 32, and said guide-roller is adapted to engage the lower marginal face of a trackway 33 when the carriage 20 is moved to the left by inward movement of the piston rod 19.

The trackway 33 is mounted upon an overhanging support 34 extending laterally from the framework 10, and the forward end thereof is so positioned as not to be engaged by the guide-roller 32 when the carriage 20 is in the inoperative, work-receiving position shown in Figure 1, whereby the clamp 25 may be lifted to permit mounting of the work in the work-receiving space 27. The rear end of the trackway 33 is cut away at 35 so that when the carriage is in the position shown in broken lines in Figure 2 and full lines in Figure 3, the guide-roller 32 is out of contact with the trackway and the clamp 25 may be opened to lift the guide or shield 30 from the work to permit the application of a pneumatic pad 36 thereto, said pad being applied to the cuffed back portion of the work upon the mandrel 15.

The pad 36 is enclosed in a ring clamp 37 which confines the pad exteriorly so that inflation of the pad distends it inwardly so as to press the cuffed portion of the tube 28, which portion includes the splice 28ª, against the heated mandrel to effect vulcanization of the splice.

In the operation of the apparatus, the carriage 20 initially is in the inoperative position shown in Figure 1, and the clamp 25 is in open or raised position. With the apparatus so disposed, a spliced tube 28 in deflated condition is mounted within the heated mandrel 15 with the splice 28ª of the tube positioned somewhat to the right of the mandrel as shown in Figures 1 and 2, and another portion of the tube, to the right of the splice 28ª, is mounted upon the top of the carriage and secured thereon in flattened condition by closing and locking the clamp 25. The tube 28 is then inflated with air through a valve stem 37 therein, the tube then presenting the appearance shown in Figure 2, with a portion thereof pressed against the concave surface of the shield or guide 30.

The valve 14 is then reversed to admit fluid to the front end of the cylinder 11 and to vent the rear end thereof whereby the piston rod 19 is retracted and the carriage 20 drawn to the left as viewed in the drawings, with the result that that portion of the tube beneath the guide-plate 30 is urged toward the mandrel 15 and folds or cuffs back over the same, so that the splice 28ª therein lies against the outer surface of the mandrel. During this operation the guide-plate 30 provides lateral support to the tube and prevents it from buckling or bending out of axial alignment with the mandrel, the guide-plate being reinforced against the pressure of the tube by engagement of the roller 32 with the trackway 33. The guide-plate also by its frictional contact with the tube, distributes much of the impelling force over a substantial area longitudinally of the tube so that there is not sharp bending of the tube against the leading side of the carriage 20.

Retractive movement of the piston rod 19 and carriage 20 ceases when the spacer-sleeve 24 abuts the stop-bracket 23, the roller 32 then being opposite the cut-away portion 35 of the trackway 33. The tube is then deflated, which is quickly accomplished because no valve plunger is yet in the valve stem 37, and the clamp 25 is raised and laid back as shown in Figure 3. The pneumatic pad 36 is then clamped about the cuffed portion of the tube on the mandrel, and inflated, vulcanization of the tube-splice 28ª then proceeding in the usual manner. After the splice is vulcanized the finished tube is removed from the apparatus, and the piston rod 19 is projected outwardly to restore the carriage 20 to its inoperative position, ready to repeat the operations as described.

The apparatus may be modified within the scope of the appended claims which are not limited wholly to the specific construction shown and described.

What is claimed is:

1. In splice-vulcanizing apparatus, the combination of a vulcanizer comprising a tubular mandrel, and power operated means for cuffing a tube upon the exterior face of said mandrel.

2. In splice-vulcanizing apparatus for tubes, the combination of a vulcanizer comprising a tubular mandrel adapted to receive a tube, means spaced from the mandrel engaging the tube and locally constricting the same, and means for cuffing the tube over said mandrel including means for moving the tube-constricting member toward the mandrel.

3. A combination as defined in claim 2 in which the tube-constricting member is so constructed and arranged as to move the constricted portion of the tube axially of the tube and mandrel.

4. In a tube-splice-vulcanizing apparatus, the combination of a vulcanizer comprising a tubular mandrel adapted to receive a tube therethrough, means spaced from the mandrel in axial alignment therewith for gripping the tube, means for moving the tube-gripping means toward the mandrel to cuff the tube thereover, and a lateral support for the tube between the mandrel and the tube-gripping member.

5. A combination as defined in claim 4 in which the lateral support is carried by and moves with the tube-gripping member.

6. In a tube-splice-vulcanizing apparatus, the combination of a vulcanizer comprising a tubular mandrel adapted to receive a tube therethrough, a carriage movable toward and away from said mandrel, a cover on said carriage adapted to clamp a tube thereto, and power means for cuffing the tube over said mandrel including means for moving said carriage toward the mandrel.

7. In a tube-splice-vulcanizing apparatus, the combination of a vulcanizer comprising a tubular mandrel adapted to receive a tube therethrough, a carriage movable toward and away from said mandrel, tube-gripping means on said carriage axially aligned with the mandrel, power means for reciprocating the carriage, and a tube-guiding member carried by the carriage adapted to engage the tube laterally between the mandrel and the carriage.

8. In a tube-splice-vulcanizing apparatus, the combination of a vulcanizer comprising a tubular mandrel adapted to receive a tube therethrough, means spaced from the mandrel and in axial alignment therewith for gripping the tube locally, power means for moving the tube-gripping means toward the mandrel to cuff the tube thereover, an overhanging tube-guide secured at one end to the tube-gripping member, and means engaging the other end of the tube-guide to reinforce the same during its movement over the mandrel.

9. A combination as defined in claim 8 in which the tube-guide reinforcement comprises a roller on the guide which engages a trackway positioned in its path of movement.

10. In an apparatus for vulcanizing inner tube splices, an annular vulcanizer body having a circular vulcanizing surface and arranged to receive an inner tube within its walls, means for gripping the tube in advance of the splice of said tube around said body and in contact with said vulcanizing surface.

ANDREW B. MULLIN.